US012772163B2

(12) United States Patent
Olson

(10) Patent No.: US 12,772,163 B2
(45) Date of Patent: *Oct. 20, 2026

(54) METHOD AND APPARATUS FOR ENHANCING AN AIR-TO-GROUND WIFI SYSTEM

(71) Applicant: SMARTSKY NETWORKS LLC, Morrisville, NC (US)

(72) Inventor: Wayne E. Olson, Nokesville, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 271 days.

This patent is subject to a terminal disclaimer.

(21) Appl. No.: 18/760,259

(22) Filed: Jul. 1, 2024

(65) Prior Publication Data

US 2024/0357485 A1 Oct. 24, 2024

Related U.S. Application Data

(63) Continuation of application No. 17/778,626, filed as application No. PCT/US2020/060689 on Nov. 16, 2020, now Pat. No. 12,028,803.

(60) Provisional application No. 62/938,394, filed on Nov. 21, 2019.

(51) Int. Cl.

| | |
|---|---|
| ***H04W 48/20*** | (2009.01) |
| ***H04W 24/02*** | (2009.01) |
| ***H04W 24/08*** | (2009.01) |

(52) U.S. Cl.

CPC .......... *H04W 48/20* (2013.01); *H04W 24/02* (2013.01); *H04W 24/08* (2013.01)

(58) Field of Classification Search

None

See application file for complete search history.

(56) References Cited

U.S. PATENT DOCUMENTS

| | | | |
|---|---|---|---|
| 5,682,168 | A | 10/1997 | James et al. |
| 9,750,079 | B1 | 8/2017 | Mitchell |
| 2004/0162106 | A1 | 8/2004 | Monroe et al. |
| 2004/0203824 | A1 | 10/2004 | Mock et al. |

(Continued)

FOREIGN PATENT DOCUMENTS

| | | | |
|---|---|---|---|
| CN | 1575571 | A | 2/2005 |
| CN | 104094564 | A | 10/2014 |

(Continued)

OTHER PUBLICATIONS

International Search Report and Written Opinion from International Application No. PCT/US2020/060689 mailed Mar. 9, 2021, all pages cited in its entirety.

(Continued)

*Primary Examiner* — Faruk Hamza
*Assistant Examiner* — Cassandra L Decker
(74) *Attorney, Agent, or Firm* — Burr & Forman

(57) ABSTRACT

An aggregation router for an aircraft may include processing circuitry. The processing circuitry may be configured to receive a first channel from a first airborne radio, and receive a second channel from a second airborne radio. The first and second channels may be WAN connections to wireless communication network resources on the ground. The processing circuitry may be further configured to aggregate the first and second channels for service to LAN connections on the aircraft, which LAN connections may include one or more short range wireless communication access points.

18 Claims, 4 Drawing Sheets

(56) References Cited

U.S. PATENT DOCUMENTS

| | | | |
|---|---|---|---|
| 2007/0030857 | A1 | 2/2007 | Fulknier et al. |
| 2007/0127460 | A1 | 6/2007 | Wilber et al. |
| 2008/0220788 | A1 | 9/2008 | Stanwood et al. |
| 2013/0155902 | A1 | 6/2013 | Feng et al. |
| 2014/0150034 | A1 | 5/2014 | Frisco et al. |
| 2014/0307653 | A1 | 10/2014 | Liu et al. |
| 2014/0327577 | A1 | 11/2014 | Ozaki et al. |
| 2015/0264577 | A1 | 9/2015 | Yang et al. |
| 2016/0099769 | A1 | 4/2016 | Moffatt et al. |
| 2016/0119052 | A1 | 4/2016 | Frerking et al. |
| 2016/0119938 | A1 | 4/2016 | Frerking et al. |
| 2017/0163720 | A1 | 6/2017 | Bergek et al. |
| 2018/0014261 | A1 | 1/2018 | Miranda et al. |
| 2018/0287691 | A1 | 10/2018 | Jalali |
| 2019/0103952 | A1 | 4/2019 | Goudal et al. |
| 2019/0149224 | A1 | 5/2019 | Moffatt et al. |
| 2020/0343638 | A1 | 10/2020 | Schay et al. |
| 2020/0403690 | A1 | 12/2020 | Stauffer et al. |
| 2021/0014873 | A1 | 1/2021 | Akhtar et al. |
| 2021/0258033 | A1 | 8/2021 | Zhu et al. |

FOREIGN PATENT DOCUMENTS

| | | | |
|---|---|---|---|
| CN | 106982477 | A | 7/2017 |
| CN | 208849768 | U | 5/2019 |
| CN | 110417454 | A | 11/2019 |
| JP | 2014207626 | A | 10/2014 |
| JP | 2017046077 | A | 3/2017 |
| JP | 2019512981 | A | 5/2019 |
| JP | 2019531615 | A | 10/2019 |
| WO | 2013166464 | A1 | 11/2013 |
| WO | 2019084725 | A1 | 5/2019 |
| WO | 2019151056 | A1 | 8/2019 |

OTHER PUBLICATIONS

Notice for Reasons for Rejection Received in Corresponding Japanese Application No. 2022-529515 mailed Oct. 25, 2022, all pages cited in its entirety.

First Office Action and Search Report from corresponding Chinese Application No. 202080092222.4 issued Jan. 12, 2023, all pages cited in its entirety.

Decision of Refusal in corresponding Japanese Application No. JP2022-529515 mailed Feb. 21, 2023, all pages cited in its entirety.

Garmin GPS100 Aviation Kit Installation Manual, Garmin International Inc., October 1002. (Year: 1992).

Office Action issued in corresponding Japanese Patent Application No. 2023-097437 mailed Aug. 13, 2024, all pages cited in its entirety.

Examination Report No. 1 from the corresponding Australian Application No. 2020387381, mailed Jun. 12, 2025, all pages cited in its entirety.

Notice of Acceptance from corresponding Australian Application No. 2020387381, mailed May 29, 2026, all pages cited in its entirety.

METHOD AND APPARATUS FOR ENHANCING AN AIR-TO-GROUND WIFI SYSTEM

TECHNICAL FIELD

Example embodiments generally relate to air-to-ground (ATG) communication network performance and, more particularly, relate to a method and apparatus for enhancing the performance of an ATG Wi-Fi system.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility. However, in spite of the familiarity that people have with remaining continuously connected to networks, people have become equally familiar with not having a satisfying user experience while in the air.

Although satellite networks have provided improvements in the amount of bandwidth that is available to users on aircraft, and have also provided improved connection reliability, the costs of employing and using satellite networks along with the ever present problem of latency continues to limit the user experience associated with satellite communications. Meanwhile, ATG networks have continued to improve in terms of reducing cost and increasing reliability, all while avoiding the latency problem. In this regard, some ATG networks have managed to provide very large bandwidth connections from airborne assets to the ground. Effectively, ATG networks may be able to provide a very large "pipe" through which data can flow in both directions from an aircraft. In fact, the size of the pipe may be so significant that capacity issues are no longer associated with the link to the aircraft, but may be associated instead with the onboard Wi-Fi system.

Accordingly, it may be desirable to provide enhancements to onboard Wi-Fi capabilities in order to overcome the potential for capacity issues.

BRIEF SUMMARY OF SOME EXAMPLES

In one example embodiment, an aggregation router for an aircraft may be provided. The aggregation router may include processing circuitry. The processing circuitry may be configured to receive a first channel from a first airborne radio, and receive a second channel from a second airborne radio. The first and second channels may be WAN connections to wireless communication network resources on the ground. The processing circuitry may be further configured to aggregate the first and second channels for service to LAN connections on the aircraft, which LAN connections may include one or more short range wireless communication access points.

In another example embodiment, a aircraft communication system may be provided. The system may include an antenna assembly configured to send wireless signals to and receive wireless signals from a ground station and an airborne radio assembly associated with a plurality of wide area network (WAN) connections. The WAN connections may include a first channel associated with a first airborne radio of the airborne radio assembly and a second channel associated with a second airborne radio of the airborne radio assembly. The system may further include an aggregation router configured to aggregate the first and second channels for service to local area network (LAN) connections on the aircraft. The LAN connections may include one or more short range wireless communication access points.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
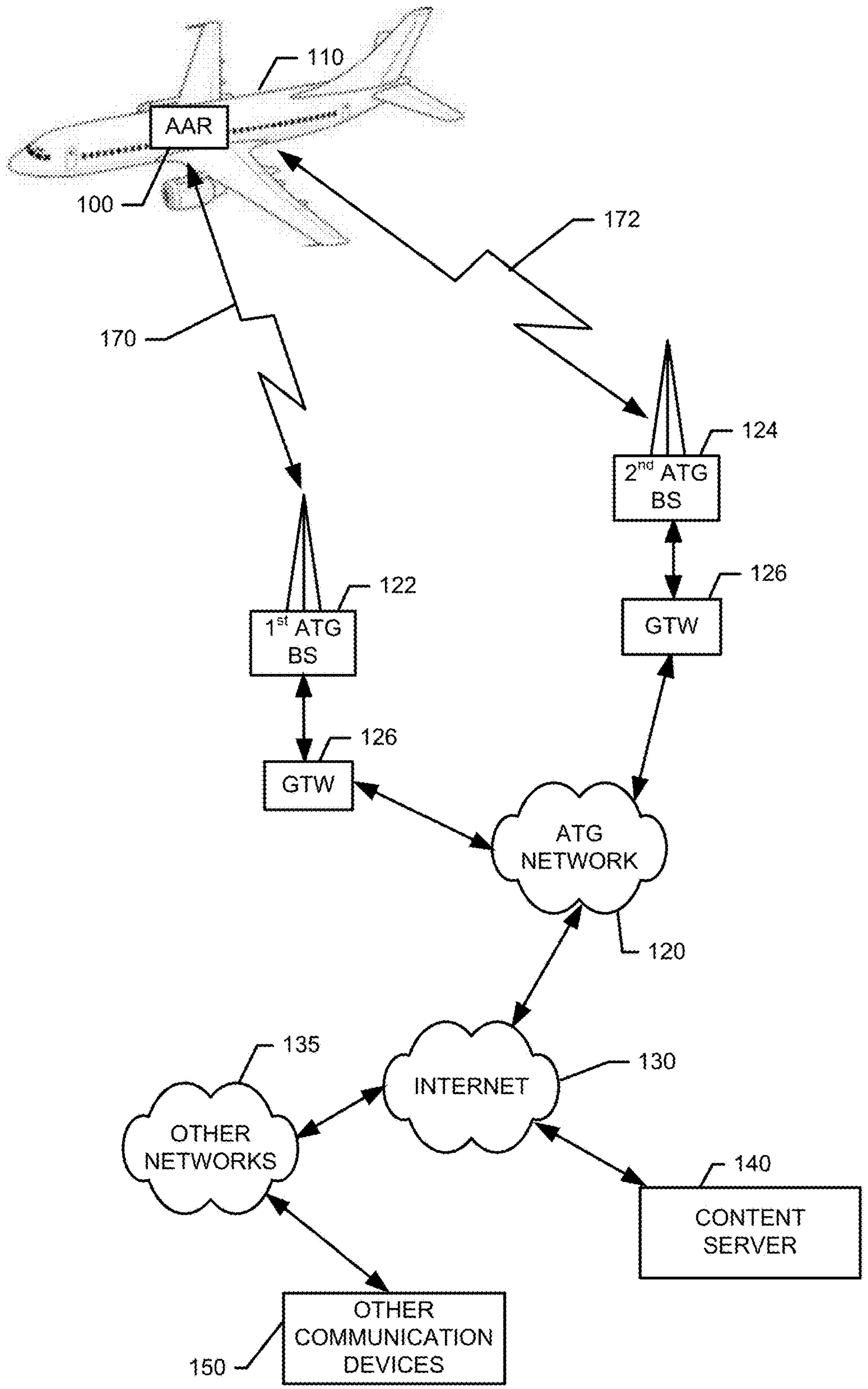
FIG. 1 illustrates a block diagram of a system for providing wireless communication to an aircraft in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," "system," "device" and the like are intended to include a computer-related entity, such as but not limited to hardware, firmware, a combination of hardware and software, or software in execution on some sort of hardware. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Some example embodiments may provide an ATG aggregation router that is configured to enable the aggregation of multiple ATG channels into a single larger aggregated channel (or pipe) for use by the passengers in the cabin of the aircraft. The aggregation of multiple ATG channels by an onboard router (e.g., a Wi-Fi router) can enable the user experience that any user of the ATG network for various types of applications or services provided thereby to be improved. When certain networks employ beam forming technology, in which beams are dynamically steered or selected to maximize range and quality of the ATG channels, while maintaining high bandwidth, the ATG aggregation router can enable a minimum quality level for the user experience to be maintained, even with very large numbers of onboard users.

FIG. 1 illustrates an example layout of a system in which any one or more of multiple instances of an ATG aggregation router 100 of an example embodiment may be employed. As shown in FIG. 1, the ATG aggregation router 100 may be located on an aircraft 110 and may be configured to operate in connection with a wireless network such as an ATG network 120.

As shown in FIG. 1, the ATG network 120 may include a plurality of wireless access points (APs) or base stations (BSs) that include antennas configured for wireless communication. Thus, for example, the ATG network 120 may include a first ATG BS 122 and a second ATG ABSP 124, each of which may be base stations, among a plurality of geographically distributed base stations that combine to define the coverage area for the ATG network 120. The first and second ATG BSs 122 and 124 may each be in communication with the ATG network 120 via a GTW device 126. The ATG network 120 may also be in communication with a wide area network such as the Internet 130, VPNs or other communication networks. In some embodiments, the ATG network 120 may also include or otherwise be coupled to a packet-switched core or other telecommunications network.

Each base station of the ATG network 120 may have a wired (or wireless) backhaul connection to its respective wireless network to allow access thereto for the wireless communications devices (e.g., user equipment (UE)) that are located on the aircraft 110 to be connected with the Internet 130 or other networks 135 (e.g., terrestrial networks including cellular networks, satellite networks, etc.) in order to communicate with content servers 140, other communication devices 150, and/or the like.

As can be appreciated from FIG. 1, the aircraft 110 may move such that for respective periods of time, the aircraft 110 is located in a cell or coverage area of either the first ATG BS 122 or the second ATG BS 124, and communication traffic or data directed to and from the aircraft 110 may be provided via a respective one of the first ATG BS 122 or the second ATG BS 124. For example, when being served by the first ATG BS 122, a first communication link 170 may be established between communication equipment (e.g., radio equipment) on the aircraft 110 and the first ATG BS 122. When being served by the second ATG BS 124, a second communication link 172 may be established between the communication equipment on the aircraft 110 and the second ATG BS 124. Assuming the first ATG BS 122 and the second ATG BS 124 have overlapping coverage areas, a handover between the first and second communication links 170 and 172 may be accomplished while in the overlap region.

The first communication link 170 and the second communication link 172 may each be established using one or more of a plurality of separate channels. In some example embodiments, the ATG network 120 may employ spectrum located in one of the industrial, scientific, and medical (ISM) radio bands. Thus, for example, the first and second communication links 170 and 172 may employ three channels that may be separated from each other by a predefined amount. In an example embodiment, the three channels may include a first channel centered at 2450.7 MHz, a second channel centered at 2460.7 MHz, and a third channel centered at 2470.7 MHz.

Under normal circumstances, although the first ATG BS 122 (or the second ATG BS 124) transmits all three channels directed toward the aircraft 110, the communication equipment on the aircraft 110 (and therefore also the router that provides short range wireless communication, e.g., via Wi-Fi, to the UEs of the passengers) will only use one of the three channels. The channel that is used may either be predetermined, or may be selected based on qualitative criteria. For example, an airborne radio (ABR) of the aircraft 110 may monitor all three channels and pick the best one for use by the Wi-Fi router onboard the aircraft 110. The "best" channel may be selected based on the amount of noise pollution measured for each respective channel such that the channel with the lowest noise is selected as the channel that provides service to passengers via the Wi-Fi router.

Figure 2:
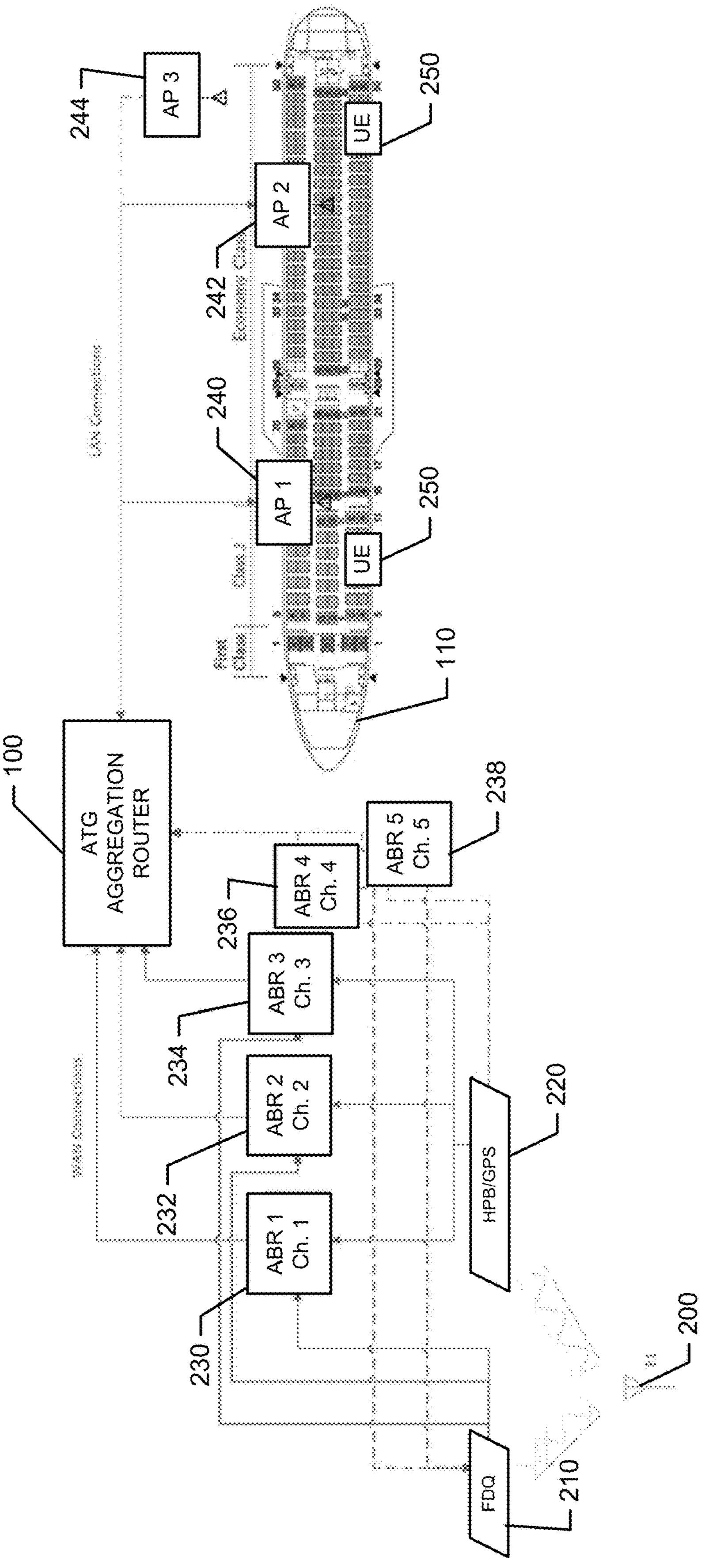
FIG. 2 illustrates a block diagram of an airborne system for maintaining user experience at acceptable levels according to an example embodiment.

However, in accordance with an example embodiment, the ATG aggregation router 100 may be configured to aggregate multiple channels together (either on a permanent basis or temporary (e.g., selectively or situationally)) to improve the user experience in the cabin of the aircraft 110. FIG. 2 illustrates functional block diagram of a system employing the ATG aggregation router 100 of an example embodiment. As shown in FIG. 2, the system may include a ground antenna 200, which may be associated with the first ATG BS 122, second ATG BS 124, or another base station associated with the ATG network 120 (or another network capable of communicating with the aircraft 110). The ground antenna 200 may transmit to (or receive from) onboard antenna assembly associated with the aircraft 110 using waveforms and/or frequencies associated with the ATG network 120. Thus, for example, the ground antenna 200 may utilize beamforming and 2.4 GHz waveforms to communicate with airborne antennas of the antenna assembly.

In the example of FIG. 2, the airborne antennas include primary antenna 210 and a high performance blade (HPB) antenna 220. In some cases, the HPB antenna 220 may be configured to also include a global positioning system (GPS) module to process GPS signals. Signals received by the airborne antennas may be fed into ABR circuitry that may be configured to define corresponding individual channels. For example, ABR 1 230 may be associated with the first channel (e.g., centered at 2450.7 MHz), ABR 2 232 may be associated with the second channel (e.g., centered at 2460.7 MHz), and ABR 3 234 may be associated with the third channel (e.g., centered at 2470.7 MHz). Notably, other ABRs (e.g., ABR 4 236 and ABR 5 238) may or may not also be included. The other ABRs may be associated with additional ATG channels, or may be associated with other data sources (e.g., satellite network channels, or other network channels).

As noted above, in a typical situation, the ground antenna 200 transmits at least the first channel, second channel and third channel. However, normally the router that is employed will only utilize one of the channels to enable UEs of the passengers to access services and content communicated via the utilized channel. In particular, the router would operably couple the utilized channel to a first access point (AP 1) 240, a second access point (AP 2) 242 and (if applicable) any additional access points (e.g., third access point (AP 3) 244). However, as also noted above, following this typical paradigm can (particularly for large numbers of UEs utilizing high bandwidth applications) result in reduced performance or quality at the UEs as the bandwidth available via the utilized channel is divided significantly.

Meanwhile, the ATG aggregation router 100 of an example embodiment can avoid this problem. In this regard, for example, the wide area network (WAN) connections to the ATG aggregation router 100 may all be provided such that each of the ABR channels is fed into the ATG aggregation router 100. Thereafter, local area network (LAN) connections may be established from the ATG aggregation router 100 to the first, second and/or third access points 240, 242 and/or 244. The ATG aggregation router 100 may be configured to select one or more of the sources available from the WAN connections to serve devices (e.g., UEs 250 of passengers of the aircraft 110) via the LAN connections. In other words, the ATG aggregation router 100 may be configured to aggregate any or all of the WAN connections for delivery of services on the LAN connection side.

The nature of the configuration of the ATG aggregation router 100 to support this capability will be discussed in greater detail below. However, in general terms, it should be appreciated that the ability of the ATG aggregation router 100 to aggregate multiple different ATG channels into a single "pipe" can enable even large numbers of UEs 250 to continue to receive services with superior speed, bandwidth, or various other aspects of network performance.

Figure 3:
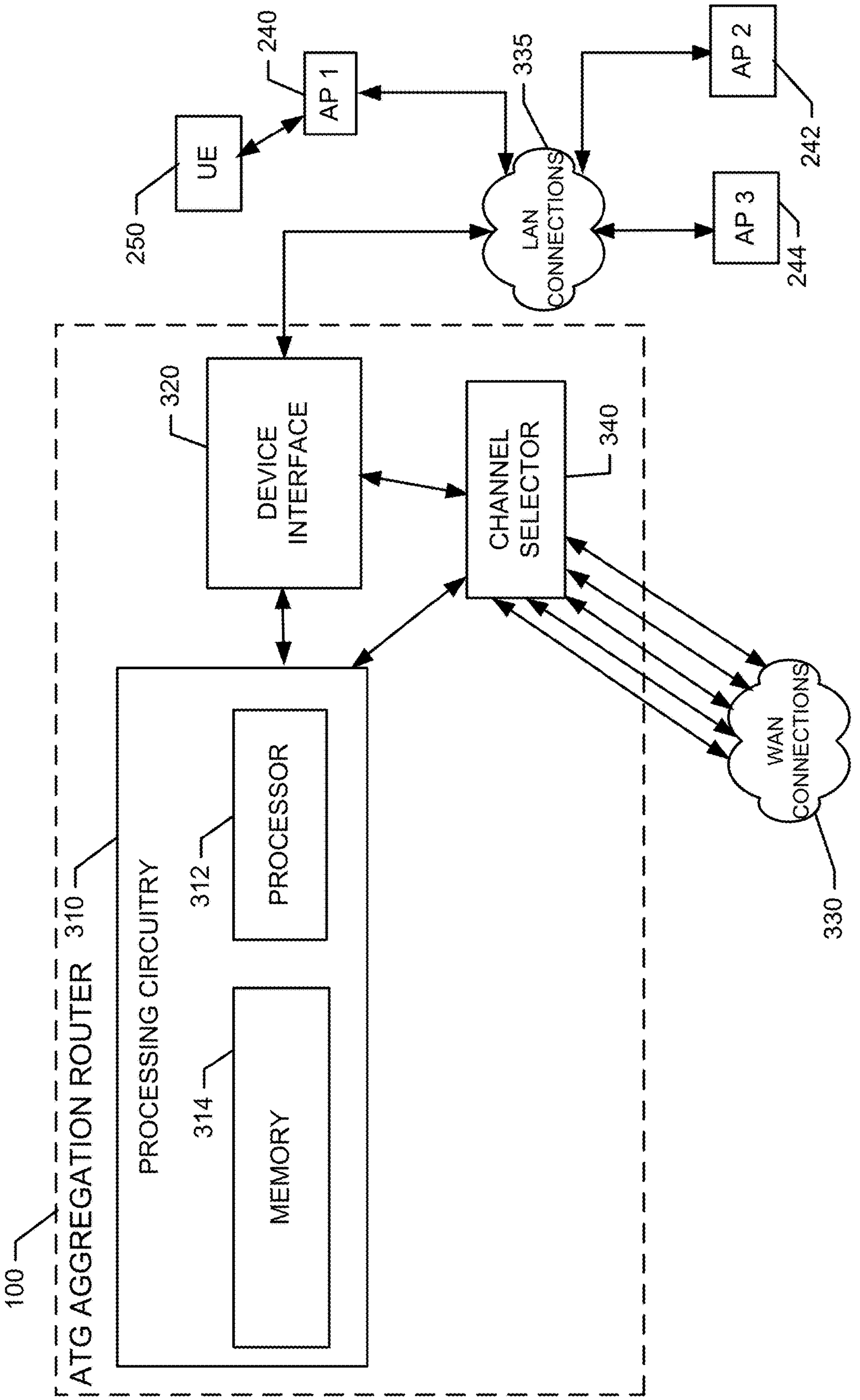
FIG. 3 illustrates a block diagram of an ATG aggregation router according to an example embodiment.

FIG. 3 illustrates a functional block diagram of the ATG aggregation router 100 of an example embodiment. In this regard, the ATG aggregation router 100 may include processing circuitry 310 configured to perform the tasks, operations and/or functions of the ATG aggregation router 100 as described herein. As such, the processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320. As such, the processing circuitry 310 may be embodied as a circuit chip (e.g., an integrated circuit chip) configured (e.g., with hardware, software or a combination of hardware and software) to perform operations described herein.

The ATG aggregation router 100 of FIG. 3 does not show a user interface. However, in some cases, a user interface may be included in order to enable an operator to select or change various settings or programming instructions for guiding operation of the ATG aggregation router 100. For example, modes of operation or other guidance instructions could be provided via the user interface (if included).

The device interface 320 may include one or more interface mechanisms for enabling communication with other devices, both internal and external to the ATG aggregation router 100. Thus, for example, internal modules or components and external modules, entities, web sites, devices and/or the like may all be communicated with via the device interface 320. In some cases, the device interface 320 may be any means such as a device or circuitry embodied in either hardware, or a combination of hardware and software that is configured to receive and/or transmit data from/to modules, entities, components, radios, networks, web sites, applications, etc., that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of a channel selector 340 (or channel selector module). As such, in some embodiments, the processor 312 (or the processing circuitry 310) may be said to cause each of the operations described in connection with the channel selector 340 in relation to implementation of aggregation responsive to execution of instructions or algorithms configuring the processor 312 (or processing circuitry 310) accordingly. The channel selector 340 may be controlled (e.g., by the processor 312 or processing circuitry 310) based on inputs received from the various channels (e.g., any or all of ABR 1 230, ABR 2 232, ABR 3 234, ABR 4 236 and ABR 5 238) and/or based on conditions associated with the LAN connection side. In this regard, for example, the channel selector 340 may be configured to determine whether to aggregate ATG channels at all and/or which channels to aggregate based on a mode of operation of the channel selector 340 and/or based on a situational assessment of various qualitative parameters. With respect to mode, the channel selector 340 may have an aggregation mode in which aggregation is either employed always or is enabled to be employed based on the situational assessment. Alternatively, the channel selector 340 may have a normal (i.e., no aggregation) mode in which aggregation is not performed.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets relevant to defining various thresholds or decision points/criteria. Among the contents of the memory 314, applications and/or instructions may be stored for execution by the processor 312 in order to carry out the functionality associated with each respective application/instruction. In some cases, the applications may include instructions for controlling operation of the channel selector 340 as described herein. The control over operation may include mode selection or definition of various modes of operation of the channel selector 340.

In some example embodiments, when in the normal mode, the ATG aggregation router 100 may be configured to select a "best" channel from the inputs received from the ABRs. The best channel may then be used as the only source from among the WAN connections 330 to supply the LAN connections 335. The best channel may be selected based on having the lowest noise level or based on any other qualitative parameters the channel selector 340 is configured to monitor or receive. The channel selector 340 may be configured to periodically check the qualitative parameters or noise levels associated with each channel in order to update or otherwise re-select the best channel. Alternatively, the best channel may be maintained until the noise levels or qualitative parameters associated with the best channel degrade below a set threshold, at which time a new best channel may be selected.

When in the aggregation mode, the channel selector 340 may be configured to either aggregate at least two channels (and perhaps more), or to determine whether or not to aggregate any channels based on the situational assessment. The situational assessment may, for example, include a supply side (e.g., WAN connection side) conditional assessment and/or a demand side (e.g., LAN connection side) conditional assessment. The decisions on whether to aggregate channels at all and/or on which channels to aggregate may therefore be made by the channel selector 340 based on either or both of the supply side conditional assessment and the demand side conditional assessment.

The supply side conditional assessment may be accomplished by the channel selector 340 based on monitoring quality and/or capacity of the individual channels being supplied by the respective ones of the ABRs. For example, at any given time, the noise levels experienced by each of the channels may be different based on the number and location of local interferers that are able to be picked up by the respective ABRs. The channel selector 340 may be configured to monitor noise levels associated with each respective channel and rank each channel based on the noise levels. The channel or channels having the lowest noise or interference levels may be ranked highest. In some cases, channel grades may be assigned based on the noise levels or other detectable channel conditions that impact the signal quality of each respective channel. Thus, in addition to (or instead of) simply ranking each channel based on quality or noise level, a qualitative assessment of each channel may further be provided by the channel selector 340. In some cases, the grade or qualitative assessment of a channel may be required to be above a certain threshold or level in order for the channel to be relied upon without aggregation. Alternatively or additionally, the grade or qualitative assessment of a channel may be required to be above the certain threshold or level in order for the channel to be used in aggregation with another channel. Thus, in general terms, the qualitative assessment may be an assessment of various performance criteria that may be evaluated, and the performance criteria could include noise levels or other parameters that can be measured and evaluated.

The demand side conditional assessment may be accomplished by the channel selector 340 based on monitoring the number of UEs 250 that are demanding services on the LAN connection side. As an example, if the number of UEs 250 demanding services is below a minimum customer demand level, aggregation may not be needed in order to maintain quality of service at desired levels. Thus, aggregation of channels may not be performed and only the best channel may be used to service the LAN connection side. However, if the number of UEs 250 exceeds the minimum customer demand level, then aggregation may be employed using the best two channels. Within this paradigm, aggregation of even more channels (e.g., three channels or even the addition of non-ATG channels into the aggregation process) may be accomplished when corresponding different threshold levels of numbers of users (i.e., raw numbers of UEs 250 demanding services) are reached.

As an alternative to using the number of users as the criterion upon which demand side conditional assessments are made, the amount of bandwidth demanded (by any number of users) may be used. Thus, for example, the channel selector 340 may be configured to periodically monitor the amount of bandwidth being demanded from the UEs 250. If the amount of bandwidth is below a minimum bandwidth demand level, aggregation may not be needed in order to maintain quality of service at desired levels. Thus, aggregation of channels may not be performed and only the best channel may be used to service the LAN connection side. However, if the amount of bandwidth being demanded exceeds the minimum bandwidth demand level, then aggregation may be employed using the best two channels. If the amount of bandwidth exceeds further demand thresholds than corresponding additional channels (including non-ATG channels) may be aggregated accordingly when the corresponding different threshold levels of bandwidth are reached.

Demand side conditional assessments may also be made based on performing a ping test, jitter test and/or measuring download/upload speed information or latency. For each of these criteria, one or more thresholds may be defined. Below the lowest threshold, aggregation may not be performed. Above the lowest threshold, aggregation may be performed using the top two ranked channels. Above respective higher thresholds, new channels (including potentially non-ATG channels) may be added in aggregation.

In still other cases, rather than measuring specific parameters, the type of applications being run or supported by the UEs 250 may be used as a basis for making aggregation decisions. Thus, in some cases, the demand side conditional assessments may be made based on the types of applications being executed by the UEs 250. As an example, if applications that are not sensitive to latency or real time quality of service constraints are being employed, no aggregation may be employed. However, if real time and data intensive applications are being employed (e.g., video conferencing applications, video calls, etc.), then aggregation may be employed. In each of the examples above, number of users, bandwidth, the various performance tests mentioned above, and the types of applications run may each be considered to be qualitative demand indicators. Thus, the channel selector 340 may be configured to compare the qualitative demand indicators to corresponding thresholds (e.g., for one or for each one if more than one is used) to determine whether (or to what degree) to institute aggregation.

Accordingly, as a starting point, some example embodiments may either employ aggregation or not purely based on mode selection (e.g., in an on/off or binary context). The channel selector 340 may rank and select the best channel when turned off, and may aggregate one or more channels (in some cases based on rankings) when turned on. However, in other cases, the channel selector 340 may be more "intelligent" in that the channel selector 340 may (when enabled or turned on) be configured to consider either or both of the supply side conditional assessment and the demand side conditional assessment when determining whether to aggregate and how to do so.

Examples associated with using the supply side conditional assessment and the demand side conditional assessment are each described above, and can be used independently of each other. However, in some cases, the channel selector 340 may further be configured to use both the supply side conditional assessment and the demand side conditional assessment to make aggregation decisions. For example, the demand side conditional assessment may indicate a bandwidth demand that is above the minimum bandwidth demand level thereby triggering addition of another channel in aggregation with the best channel. However, if the supply side conditional assessment indicates that there is not additional channel that has a ranking sufficient to merit adding the channel in aggregation, then no aggregation may be performed. Similarly, as another example, if the supply side conditional assessment indicates excellent channel rankings for two or even three channels, aggregation may nevertheless not be employed if the demand side conditional assessment indicates that there is very low demand for resources.

Figure 4:
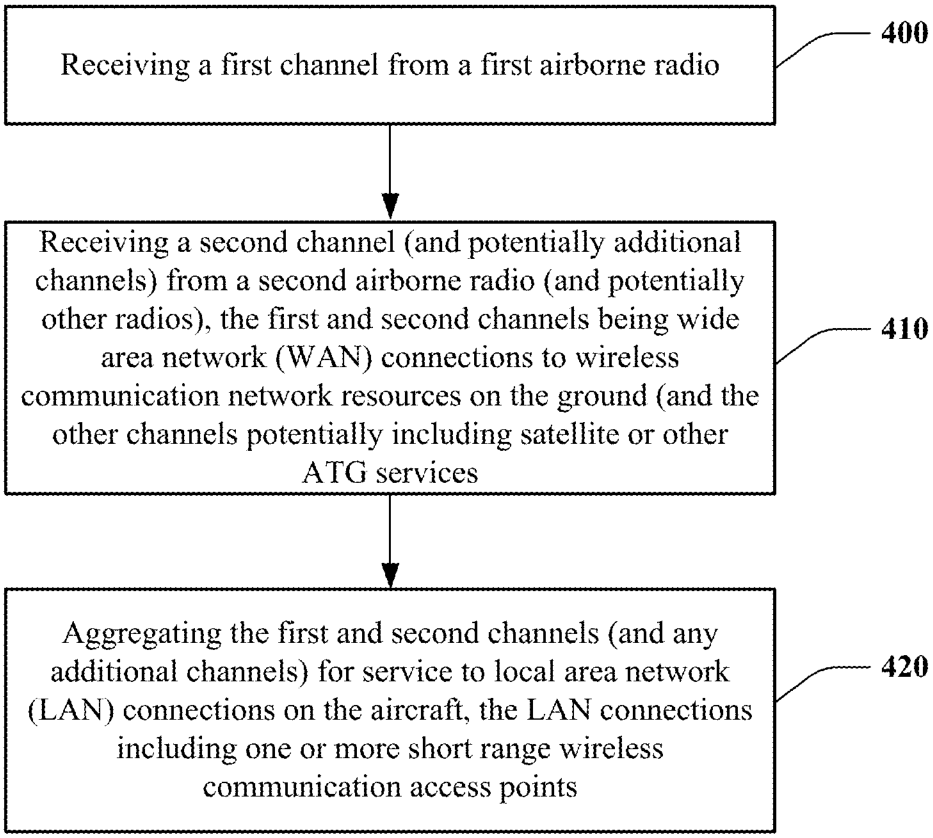
FIG. 4 illustrates a block diagram of a method of employing the ATG aggregation router according to an example embodiment.

As such, the systems of FIGS. 1 and 2 may provide an environment in which the ATG aggregation router 100 of FIG. 3 may provide a mechanism via which a number of useful methods may be practiced. FIG. 4 illustrates a block diagram of one method that may be associated with the systems of FIGS. 1 and 2, and the ATG aggregation router 100 of FIG. 3. From a technical perspective, the ATG aggregation router 100 described above may be used to support some or all of the operations described in FIG. 4. As such, the platforms/components/modules described in FIGS. 1, 2 and 3 may be used to facilitate the implementation of several computer program and/or network communication based interactions. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving a first channel from a first airborne radio at operation 400, and receiving a second channel from a second airborne radio at operation 410. Of note, operation 410 could further include receiving a third channel and, in some cases, more than three channels (e.g., a fourth and fifth channel). The first and second channels may be WAN connections to wireless communication network resources on the ground. The third channel may also be similar to the first and second channels (e.g., an ATG connection from a single source), and the fourth and fifth channels could be from satellite services, or from other ATG sources or networks. The method may further include aggregating the first and second channels for service to LAN connections on the aircraft, which LAN connections may include one or more short range wireless communication access points at operation 420. If operation 410 includes additional channels (e.g., the third, fourth and/or fifth channels), then operation 420 may include aggregation of these additional channels as well.

In an example embodiment, an aggregation router for an aircraft may be provided. The aggregation router may include processing circuitry. The processing circuitry may be configured to receive a first channel from a first airborne radio, and receive a second channel from a second airborne radio. The first and second channels may be WAN connections to wireless communication network resources on the ground. The processing circuitry may be further configured to aggregate the first and second channels for service to LAN connections on the aircraft, which LAN connections may include one or more short range wireless communication access points.

In some embodiments, the aggregation router may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. Thus, for example, the aggregation router may be configured to rank the first channel and the second channel based on performance criteria. The aggregation router may also be configured to include a first mode in which the first and second channels are aggregated, and a second mode in which, instead of aggregating the first and second channels, a higher ranked one of the first channel or the second channel is selected to service the LAN connections. In other words, although the basic functionality of being able to perform aggregation may be present, the further capability to turn that functionality off may also be provided. Moreover, the capability to turn the functionality off or on based on intelligent processing of certain situations (e.g., situational awareness) may be provided in some cases. In an example embodiment, the aggregation router may be configured to select between operating in the first mode or the second mode based on a supply side conditional assessment associated with the WAN connections or a demand side conditional assessment associated with UE access via the LAN connections. In some cases, the supply side conditional assessment may include monitoring characteristics of the first channel and the second channel and determining whether the characteristics monitored are above a threshold required to qualify the first and second channels to be aggregated. In an example embodiment, the characteristics may include noise or interference levels. In some cases, the demand side conditional assessment may include comparing one or more qualitative demand indicators to a threshold and, in response to the threshold being exceeded, aggregating the first and second channel. In an example embodiment, the qualitative demand indicators may include a number of users, bandwidth, a jitter test, an upload speed test, a download speed test, a latency test, a ping test, or a type of application being run at the UE. In some cases, the aggregation router may be configured to select between operating in the first mode or the second mode based on the supply side conditional assessment and the demand side conditional assessment independent of each other. In an example embodiment, the aggregation router may be configured to select between operating in the first mode or the second mode based on a combination of the supply side conditional assessment and the demand side conditional assessment. In some cases, the aggregation router may be configured to monitor a third channel from a third airborne radio, and a fourth channel from a fourth airborne radio. The first and second channels may be ATG network channels, and at least one of the third channel and the fourth channel may not be an ATG network channel. The aggregation router may be configured to aggregate the first, second, third and fourth channels for service to LAN connections on the aircraft.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An aggregation router for an aircraft, the aggregation router comprising processing circuitry configured to:

receive a first channel employing spectrum located in an industrial, scientific, and medical (ISM) radio band centered at 2.45 GHz from a first airborne radio;

receive a second channel employing spectrum located in the ISM radio band centered at 2.45 GHz from a second airborne radio, the first and second channels being wide area network (WAN) connections to wireless communication network resources on the ground and being separated from each other by 10 MHz; and aggregate the first and second channels for service to local area network (LAN) connections on the aircraft, the LAN connections including one or more short range wireless communication access points, wherein the aggregation router is configured to rank the first channel and the second channel based on performance criteria, and wherein the aggregation router is configured to shift, responsive to operator selection, between a first mode in which the first and second channels are aggregated, and a second mode in which, instead of aggregating the first and second channels, a higher ranked one of the first channel or the second channel is selected to service the LAN connections.

2. The aggregation router of claim 1, wherein each of the first and second airborne radios is operably coupled to a primary antenna and a blade antenna.

3. The aggregation router of claim 1, wherein the aggregation router is configured to select between operating in the first mode or the second mode based on a supply side conditional assessment associated with the WAN connections or a demand side conditional assessment associated with user equipment (UE) access via the LAN connections.

4. The aggregation router of claim 3, wherein the supply side conditional assessment comprises monitoring characteristics of the first channel and the second channel and determining whether the characteristics monitored are above a threshold required to qualify the first and second channels to be aggregated.

5. The aggregation router of claim 4, wherein the characteristics include noise or interference levels.

6. The aggregation router of claim 3, wherein the demand side conditional assessment comprises comparing one or more qualitative demand indicators to a threshold and, in response to the threshold being exceeded, aggregating the first and second channels.

7. The aggregation router of claim 6, wherein the qualitative demand indicators include a number of users, bandwidth, a jitter test, an upload speed test, a download speed test, a latency test, a ping test, or a type of application being run at a UE.

8. The aggregation router of claim 3, wherein the aggregation router is configured to select between operating in the first mode or the second mode based on a combination of the supply side conditional assessment and the demand side conditional assessment.

9. The aggregation router of claim 3, wherein the aggregation router is configured to monitor a third channel from a third airborne radio, and a fourth channel from a fourth airborne radio, wherein the first and second channels are air-to-ground (ATG) network channels, at least one of the third channel and the fourth channel is not an ATG network channel, and wherein the aggregation router is configured to aggregate the first, second, third and fourth channels for service to the LAN connections on the aircraft.

10. An aircraft communication system comprising:

an antenna assembly configured to send wireless signals to and receive wireless signals from a ground station;

an airborne radio assembly associated with a plurality of wide area network (WAN) connections, the WAN connections including a first channel employing spectrum located in an industrial, scientific, and medical (ISM) radio band centered at 2.45 GHz associated with a first airborne radio of the airborne radio assembly and a second channel employing spectrum located in the ISM radio band centered at 2.45 GHz associated with a second airborne radio of the airborne radio assembly, the first and second channels being separated from each other by 10 MHz; and an aggregation router configured to aggregate the first and second channels for service to local area network (LAN) connections on an aircraft, the LAN connections including one or more short range wireless communication access points, wherein the aggregation router is configured to rank the first channel and the second channel based on performance criteria, and wherein the aggregation router is configured to shift, responsive to operator selection, between a first mode in which the first and second channels are aggregated, and a second mode in which, instead of aggregating the first and second channels, a higher ranked one of the first channel or the second channel is selected to service the LAN connections.

11. The system of claim 10, wherein each of the first and second airborne radios is operably coupled to a primary antenna and a blade antenna.

12. The system of claim 10, wherein the aggregation router is configured to select between operating in the first mode or the second mode based on a supply side conditional assessment associated with the WAN connections or a demand side conditional assessment associated with user equipment (UE) access via the LAN connections.

13. The system of claim 12, wherein the supply side conditional assessment comprises monitoring characteristics of the first channel and the second channel and determining whether the characteristics monitored are above a threshold required to qualify the first and second channels to be aggregated.

14. The system of claim 13, wherein the characteristics include noise or interference levels.

15. The system of claim 12, wherein the demand side conditional assessment comprises comparing one or more qualitative demand indicators to a threshold and, in response to the threshold being exceeded, aggregating the first and second channels.

16. The system of claim 15, wherein the qualitative demand indicators include a number of users, bandwidth, a jitter test, an upload speed test, a download speed test, a latency test, a ping test, or a type of application being run at a UE.

17. The system of claim 12, wherein the aggregation router is configured to select between operating in the first mode or the second mode based on a combination of the supply side conditional assessment and the demand side conditional assessment.

18. The system of claim 12, wherein the aggregation router is configured to monitor a third channel from a third airborne radio, and a fourth channel from a fourth airborne radio, wherein the first and second channels are air-to-ground (ATG) network channels, at least one of the third channel and the fourth channel is not an ATG network channel, and wherein the aggregation router is configured to aggregate the first, second, third and fourth channels for service to the LAN connections on the aircraft.

* * * * *